US012136773B2

(12) United States Patent
Allabouche et al.

(10) Patent No.: US 12,136,773 B2
(45) Date of Patent: Nov. 5, 2024

(54) MONOPOLE WIRE-PATCH ANTENNA WITH ENLARGED BANDWIDTH

(71) Applicant: COMMISSARIAT A L'ENERGIE ATOMIQUE ET AUX ENERGIES ALTERNATIVES, Paris (FR)

(72) Inventors: Kaoutar Allabouche, Grenoble (FR); Serge Bories, Grenoble (FR); Christophe Delaveaud, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 79 days.

(21) Appl. No.: 18/086,812

(22) Filed: Dec. 22, 2022

(65) Prior Publication Data

US 2023/0208038 A1 Jun. 29, 2023
US 2024/0030610 A2 Jan. 25, 2024

(30) Foreign Application Priority Data

Dec. 23, 2021 (FR) ....................................... 2114355

(51) Int. Cl.
*H01Q 9/04* (2006.01)
*H01Q 1/27* (2006.01)
*H01Q 1/48* (2006.01)

(52) U.S. Cl.
CPC ............. *H01Q 9/0457* (2013.01); *H01Q 1/27* (2013.01); *H01Q 1/48* (2013.01); *H01Q 9/0421* (2013.01)

(58) Field of Classification Search
CPC .......... H01Q 9/0457; H01Q 1/27; H01Q 1/48; H01Q 9/0421
See application file for complete search history.

(56) References Cited

U.S. PATENT DOCUMENTS

2005/0116867 A1* 6/2005 Park ......................... H01Q 9/27 343/895
2006/0256015 A1 11/2006 Park et al.
2020/0227829 A1 7/2020 Jouanlanne

FOREIGN PATENT DOCUMENTS

CN 110 350 308 B 12/2020
WO 2016/097362 A1 6/2016

OTHER PUBLICATIONS

Lau, et al., "A wide-band monopolar wire-patch antenna for indoor base station applications", IEEE Antennas and Wireless Propagation Letters, vol. 4, No. 1, pp. 155-157, 2005.
Liao, et al., "A 3D Dual-band Electrically Small Monopole Antenna for Internet of Sea Applications", 2021 IEEE International Symposium on Antennas and Propagation and USNC-URSI Radio Science Meeting (APS/URSI), 2021.

* cited by examiner

*Primary Examiner* — Henry Luong
(74) *Attorney, Agent, or Firm* — BakerHostetler

(57) ABSTRACT

A wire-patch antenna includes a ground plane; a capacitive roof placed facing the ground plane at a predetermined distance of separation; a probe feed; at least one electrically conductive short-circuiting wire linking the capacitive roof and the ground plane, the short-circuiting wire being intended to excite a first resonant mode at a first resonant wavelength; and at least one electrically conductive impedance-matching wire linking the conductive short-circuiting wire and the probe feed so as to create a parasitic inductor.

14 Claims, 14 Drawing Sheets

MONOPOLE WIRE-PATCH ANTENNA WITH ENLARGED BANDWIDTH

CROSS-REFERENCE TO RELATED APPLICATION

This application claims priority to foreign French patent application No. FR 2114355, filed on Dec. 23, 2021, the disclosure of which is incorporated by reference in its entirety.

FIELD OF APPLICATION

The present invention relates to the field of antennas and more particularly to miniature antennas able to be integrated into embedded systems. More specifically, the invention relates to monopole wire-patch antennas.

The invention is applicable, by way of non-limiting example, to radiocommunication systems or to systems for fixing the geoposition of moving objects.

BACKGROUND

By "miniature antenna", what is meant is an antenna having dimensions of the order of the wavelength of the minimum resonant frequency of operation, divided by $2\times\pi$. Miniature antennas have the advantage of being compatible with embedded systems and integrated circuits widely used in the fields of mobile devices, telephony, and geopositioning. However, miniaturization of an antenna decreases the performance of the antenna in terms of bandwidth. The smaller the dimensions of the antenna are made with respect to the wavelength of operation, to improve its integrability, the narrower its bandwidth BW becomes. Furthermore, the antenna has a quality coefficient Q that is inversely proportional to the bandwidth BW of the miniaturized antenna.

By bandwidth, what is meant is the frequency range in which transfer of energy from the feed to the antenna or from the antenna to the receiver is maximized. Bandwidth may be defined in terms of a criterion dependent on the reflection coefficient of the antenna. Below, the criterion "lower than −6 dB" is chosen as limit of the reflection coefficient as a function of frequency to define bandwidth. This criterion is given merely by way of example.

By quality factor Q, what is meant is the parameter indicating the damping ratio of the antenna, equal to the ratio of the resonant frequency to the bandwidth. An antenna with a high quality factor radiates very efficiently at the frequency of radiation in a very narrow frequency band.

$$Q = \frac{f0}{BW}.$$

Thus, the performance of the miniaturized antenna depends greatly on the electrical size of the antenna (size divided by the wavelength of operation). The fundamental limits of antenna miniaturization have been the subject of much research for several decades. The designer of a miniaturized antenna must find a compromise between the following three aims, because prioritizing one of the aims has an impact on the other two:

- decreasing the dimensions of the antenna to improve the integrability of the antenna,
- increasing bandwidth BW to achieve compatibility with the evolution of high-throughput communication systems,
- Increasing quality factor, i.e. Q, to ensure effective radiation at the frequency of operation.

More particularly, monopole "wire-patch" antennas are a possible compact omnidirectional-antenna solution suitable for many wireless-communication applications. This type of antenna belongs both to the family of printed antennas and to the family of loaded monopole antennas. Thus, these antennas are still the subject of much evolutionary and developmental work intending to increase their compactness and also to enlarge their operating band. This balance between miniaturization and performance must be achieved to keep up with increases in the throughput of data communicated between various systems and in the density of implementation of the hardware architectures of these systems. Generally, prior-art miniaturized wire-patch antennas combine two resonant modes: a first resonance in the low-frequency domain with a frequency $f_1$ comprised between 0.7 GHz and 1 GHz (GSM band) and a resonance of the fundamental mode $TM_{01}$ at a frequency $f_0$ higher than 2 GHz.

To summarize, the above demonstrates the need to produce miniaturized antennas in a way that allows an optimal compromise between enlargement of the bandwidth of the antenna, miniaturization and the quality of the radiation.

In this context, one technical problem to be solved is production of a miniaturized antenna allowing bandwidth to be enlarged without increasing the electrical dimensions of the antenna or degrading its quality factor. The invention is applicable to radiocommunication devices of high integration density.

European patent EP3235058B1 describes a wire-patch antenna comprising a slot etched in its capacitive roof in order to enlarge the bandwidth of the antenna. One drawback of the solution proposed in this patent is that the proposed antenna is no longer omnidirectional and changes the polarization of the electromagnetic field towards high operating frequencies.

To overcome the limitations of existing solutions in respect of maximization of bandwidth while keeping antenna dimensions small, the invention provides a plurality of embodiments of a wire-patch antenna having a new structure allowing the input impedance of the antenna to be matched so as to enlarge its bandwidth. The solution according to the invention consists in modifying the input impedance of the antenna by means of simultaneous insertion of a parasitic capacitive element and of a parasitic inductive element. This geometric modification allows the spectral response of the antenna to be modified through excitation of an additional resonant mode. Excitation of two nearby resonant modes allows bandwidth in the targeted frequency range to be increased. In addition, this solution does not interfere with conventional higher printed-antenna modes, in particular the fundamental directional mode $TM_{01}$.

This approach may be applied using various types of parasitic element, and it is particularly relevant to the family of monopole wire-patch antennas dedicated to various, especially GSM band, uplink and downlink mobile wireless communication systems. The proposed structure according to the invention differs from known solutions especially in that it allows bandwidth to be enlarged in the low-frequency domain without degradation of the fundamental mode. In addition, one advantage of the antenna according to the invention is that the technique is simple to implement. The modified structure may be produced using commonplace manufacturing techniques, without the need for expensive modifications to the production line. An antenna with a low bulk and an enlarged bandwidth is achieved thereby. All of these advantages thus make the structure according to the invention a promising solution for applications in which multi-band, wideband and compact miniaturized antennas are employed.

SUMMARY OF THE INVENTION

One subject of the invention is a wire-patch antenna, comprising:

- a ground plane;
- a capacitive roof placed facing the ground plane at a predetermined distance of separation;
- a probe feed;
- at least one electrically conductive short-circuiting wire linking the capacitive roof and the ground plane, the short-circuiting wire being intended to excite a first resonant mode at a first resonant wavelength;
- at least one electrically conductive impedance-matching wire electrically connecting the conductive short-circuiting wire and the probe feed so as to create a parasitic inductor.

The end of the probe feed is separated from the capacitive roof by a volume of dielectric so as to create a parasitic capacitive element. The parasitic capacitive element and the parasitic inductor form a parallel LC circuit allowing a second resonant mode to be excited at a second resonant wavelength shorter than the first resonant wavelength.

According to one particular aspect of the invention, the distance of separation between the ground plane and the capacitive roof is comprised between one fiftieth of the first resonant wavelength and one tenth of the first resonant wavelength. Advantageously, the distance of separation between the ground plane and the capacitive roof is comprised between one fiftieth of the first resonant wavelength and one fifteenth of the first resonant wavelength, or even one twentieth of the first resonant wavelength.

According to one particular aspect of the invention, the capacitive roof is produced using a conductive layer forming a rectangular planar area with a width and/or length comprised between one tenth of the first resonant wavelength and one quarter of the first resonant wavelength.

According to one particular aspect of the invention, the width and/or length of the impedance-matching wire is chosen depending on the value of the bandwidth defined by the first and second resonant modes.

According to one particular aspect of the invention, the volume of dielectric separating the capacitive roof and the probe feed is a volume of air.

According to one particular aspect of the invention, the impedance-matching wire is a metal rod.

According to one particular aspect of the invention, the antenna further comprises a dielectric substrate such that:

the capacitive roof is deposited on the upper face of the substrate;

the lower face of the substrate is oriented towards the ground plane.

According to one particular aspect of the invention, the impedance-matching wire is a metal track deposited on the lower face of the substrate.

According to one particular aspect of the invention, the short-circuiting wire is connected to the capacitive roof by way of a through-via that passes right through the substrate from its lower face to its upper face.

According to one particular aspect of the invention, the substrate is confined between the end of the probe feed and the capacitive roof so as to produce the volume of dielectric.

According to one particular aspect of the invention, the probe feed is inserted into the substrate by way of a non-through via starting from its lower face.

According to one particular aspect of the invention, the short-circuiting wire and the probe feed are perpendicular to the ground plane and to the capacitive roof.

According to one particular aspect of the invention, the antenna further comprises a discrete component connected in series or in parallel with the impedance-matching wire in order to adjust the value of the impedance of the parallel LC circuit.

Another subject of the invention is a geopositioning device intended to be integrated into a moving object comprising at least one wire-patch antenna according to the invention, said antenna being configured to transmit, to a remote server, via a communication system, the various positions of the moving object.

BRIEF DESCRIPTION OF THE DRAWINGS

Other features and advantages of the present invention will become more apparent on reading the following description in relation to the following appended drawings.

DETAILED DESCRIPTION

Figure 1:
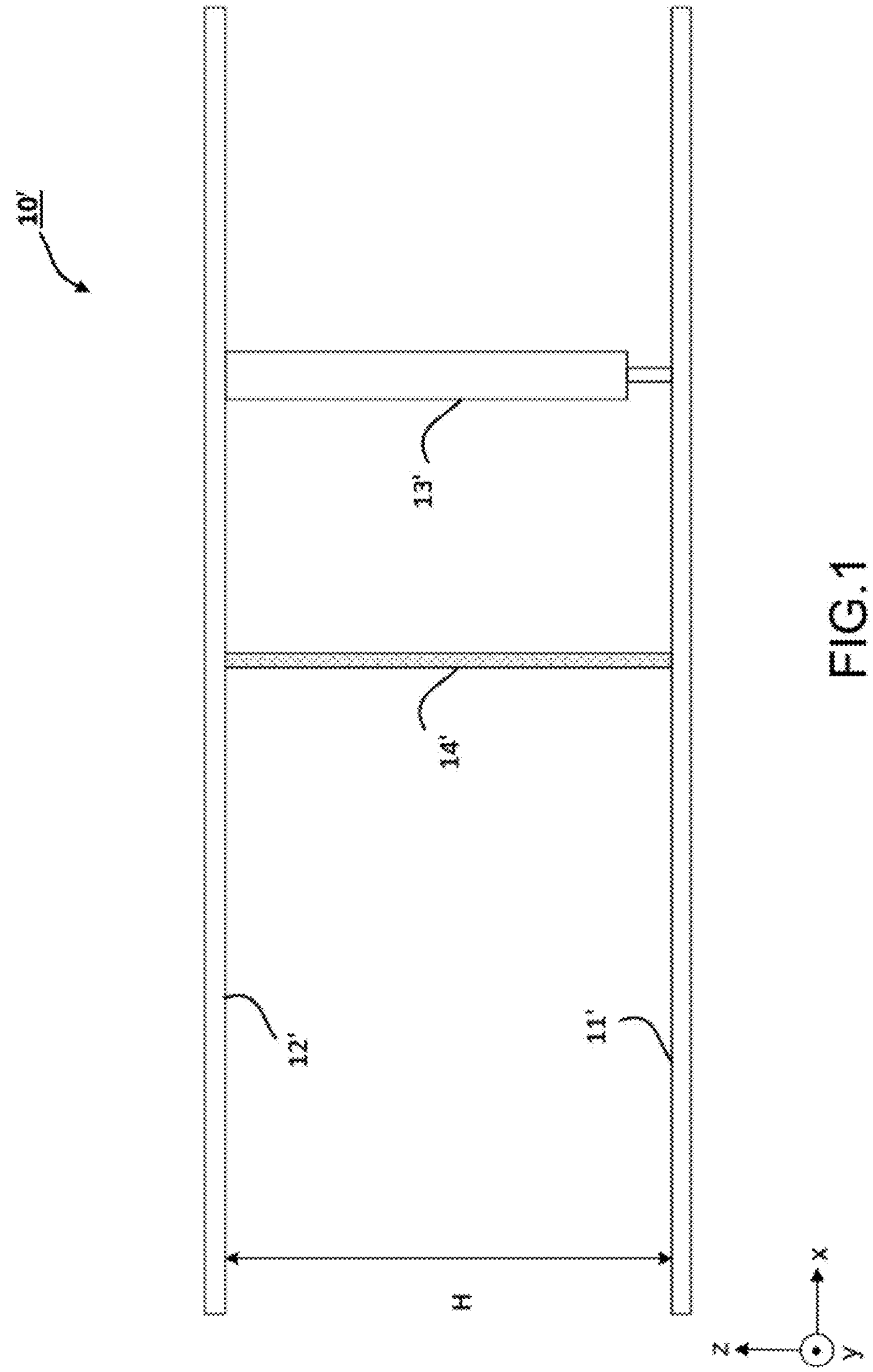
FIG. 1 shows a view of a cross section cut in the plane (x, z), illustrating a wire-patch antenna according to the prior art.

FIG. 1 illustrates a view of a cross section cut in the plane (x, z) of a wire-patch antenna according to the prior art, said antenna being intended to be integrated into a radiocommunication system. The wire-patch antenna 10' comprises a ground plane 11'; a capacitive roof 12'; a probe feed 13'; and at least one electrically conductive short-circuiting wire 14' linking the capacitive roof 12' and the ground plane 11'.

The ground plane 11' is formed by a metal layer and is linked electrically to the overall electrical ground of the system into which the antenna is integrated. The ground plane may by way of example have rectangular, square or circular shapes. The ground plane 11' may be deposited on the upper face of a lower substrate (not shown).

The capacitive roof is formed by a metal layer placed parallel to the ground plane 11' at a predetermined distance of separation. The capacitive roof may by way of example have rectangular, square or circular in shapes.

The probe feed 13' may be produced by extending the central conductor of a coaxial cable passing through the ground plane 11' to the capacitive roof 12'. The central conductor of the probe feed is connected at one end to a voltage generator (not shown) and at the other end to the capacitive roof 12'. The central conductor of the probe feed 13' is electrically isolated from the ground plane 11', which is connected to the external shielding of the coaxial cable. Combination of the probe feed 13' with the capacitive roof 12' placed facing the ground plane 11' excites the fundamental resonant mode $TM_{01}$ of the antenna at a frequency $f_0$.

The short-circuiting wire 14' forms a metal return path to ground, provoking excitation of a first resonant mode in the low-frequency domain at a frequency $f_1$ lower than that of the fundamental mode $f_0$. The frequency $f_1$ of the "low-frequency wire-patch" mode is about half to one quarter of the frequency $f_0$ of the fundamental mode. The short-circuiting wire 14' may by way of example be produced using a metal rod of cylindrical or parallelepipedal shape.

The physical parameters that influence the frequencies $f_0$ and $f_1$ are the permittivity of the dielectric occupying the volume confined between the capacitive roof 12' and the ground plane 11', the distance between the capacitive roof 12' and the ground plane 11', the radius of the probe feed 13', the radius of the short-circuiting wire 14', the distance between the probe feed 13' and the short-circuiting wire 14', and the areal dimensions of the capacitive roof 12' and the ground plane 11'.

In the context of the invention, the provided new wire-patch-antenna structure is intended to enlarge bandwidth in the vicinity of the frequency $f_1$ of the first resonant mode in the low-frequency domain without degrading the operation of the fundamental mode at $f_0$ and without increasing the dimensions of the various elements of the antenna, which dimensions were described in detail above. Thus, in the following figures, and to allow the invention to be better understood, the range containing frequencies below 1.5 GHz will be focused upon.

It will be noted here that for the miniature antennas targeted by the invention a standard sets the value of the input impedance to 50Ω. Thus, during design of the antenna, it is necessary to conform with this impedance value for the antenna to work.

Figure 2:
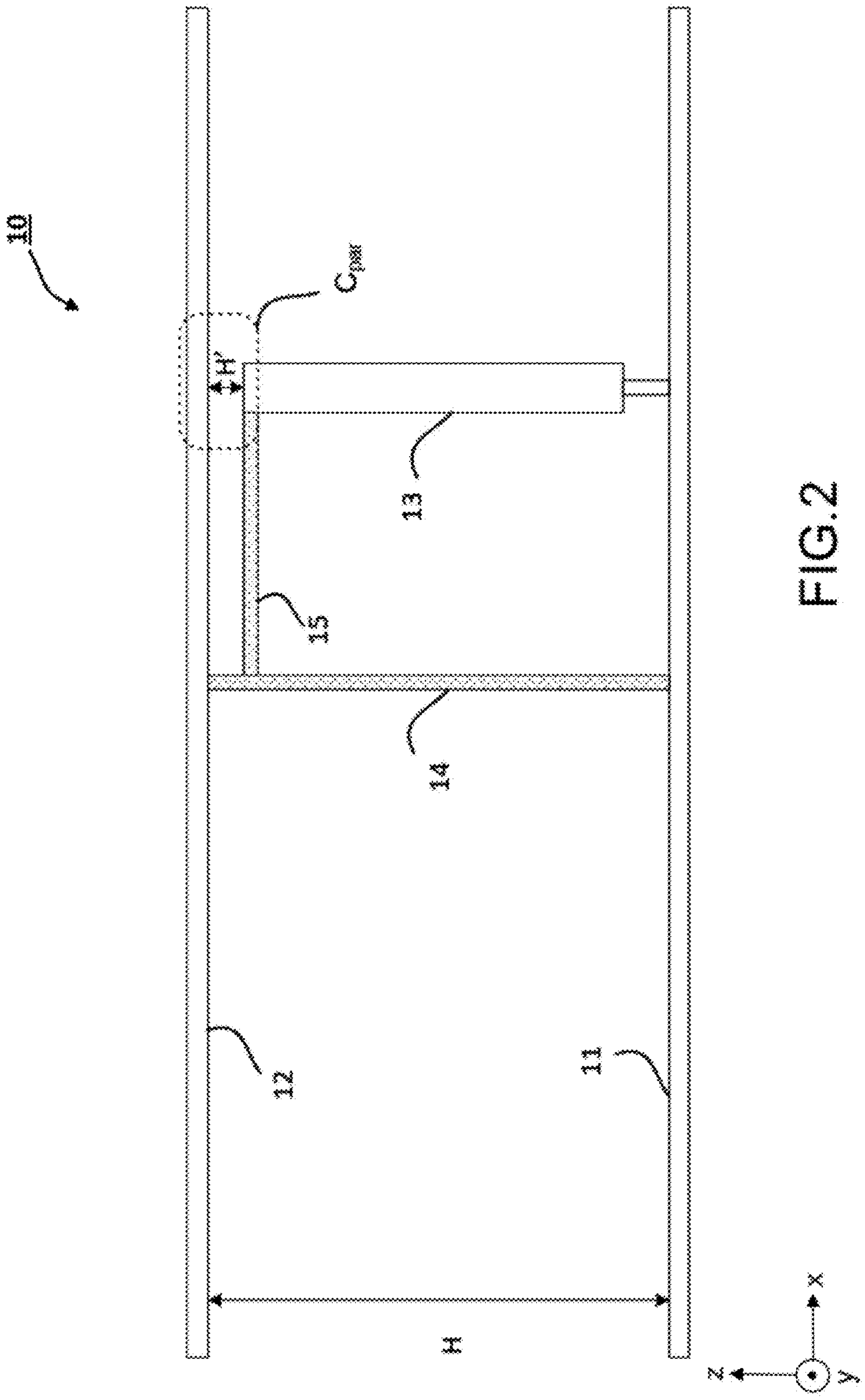
FIG. 2 shows a view of a cross section cut in the plane (x, z), illustrating a wire-patch antenna according to a first embodiment of the invention.

FIG. 2 illustrates a view of a cross section cut in the plane (x, z), illustrating a wire-patch antenna 10 according to a first embodiment of the invention. The wire-patch antenna 10 comprises a ground plane 11; a capacitive roof 12; a probe feed 13; and at least one electrically conductive short-circuiting wire 14 linking the capacitive roof 12 and the ground plane 11 and at least one electrically conductive impedance-matching wire 15 electrically connecting the conductive short-circuiting wire 14 and the probe feed 13.

The technical features detailed above in respect of the ground plane 11', capacitive roof 12' and short-circuiting wire 14' elements of the antenna 10' remain valid for the ground plane 11, capacitive roof 12 and short-circuiting wire 14 elements of the wire-patch antenna 10 according to the first embodiment of the invention.

The capacitive roof 12 rests mechanically on the rod forming the short-circuiting wire 14, and the dielectric confined between the capacitive roof 12 and the ground plane 11 is air. Advantageously, to improve the mechanical robustness of the antenna it is possible to add vertical columns of electrical insulator (plastics for example) between the capacitive roof 12 and the ground plane 11.

The probe feed 13 may be produced by passing the central conductor of a coaxial cable through the ground plane 11 to the capacitive roof 12 but stopping it short of touching said hat. The central conductor of the probe feed 13 is electrically isolated from the ground plane 11, which is connected to the external shielding of the coaxial cable. The central conductor of the probe feed is connected at one end to a voltage generator (not shown) and at the other end stops short of the capacitive roof 13 at a second predetermined distance of separation H'. Thus, the end of the probe feed 13 is separated from the capacitive roof 12 by a volume of dielectric so as to create a parasitic capacitive element $C_{par}$. In this case, the separating dielectric is air. The parasitic capacitive element $C_{par}$ is thus series connected between the probe feed 13 and the capacitive roof 12. The value of the capacitance of the parasitic capacitive element $C_{par}$ depends on the permittivity of the material confined between the end of the probe and the hat, on the radius of the probe and on the second distance of separation H'.

Introduction of an impedance-matching wire 15 creates a parasitic inductive element $L_{par}$ between the probe feed 13 and the short-circuiting wire 14. The value of the inductance of the parasitic inductive element $L_{par}$ depends on the length of the wire and on its diameter in the case of a cylindrical rod for example.

The combination of the parasitic capacitive element $C_{par}$ and of the parasitic inductor $L_{par}$ forms a parallel LC circuit connected between the end of the probe feed 13 and the capacitive roof 12. This parallel LC circuit excites a second resonant mode in the low-frequency domain at a frequency $f_2$ close to the first frequency $f_1$ of the first resonant mode in the low-frequency domain. By way of example, the absolute value of the difference between the first frequency $f_1$ and the second frequency $f_2$ is comprised between 1.1 GHz and 1.5 GHz. Thus, insertion of the impedance-matching wire 15 and the dielectric-filled space between the probe feed and the capacitive roof allowed an additional resonance to be obtained at a second resonant wavelength λ2 shorter than the first resonant wavelength λ1 (associated with $f_1$).

Just as explained above, the short-circuiting wire 14' still forms an active metal return path to ground, provoking excitation of the first resonant mode in the low-frequency domain at a frequency $f_1$.

It thus follows that, in the proposed structure, two resonances that have similar frequencies $f_1$ and $f_2$ are simultaneously excited, this enlarging the bandwidth BW in the low-frequency domain without increasing the bulk of the miniaturized antenna.

Figure 3:
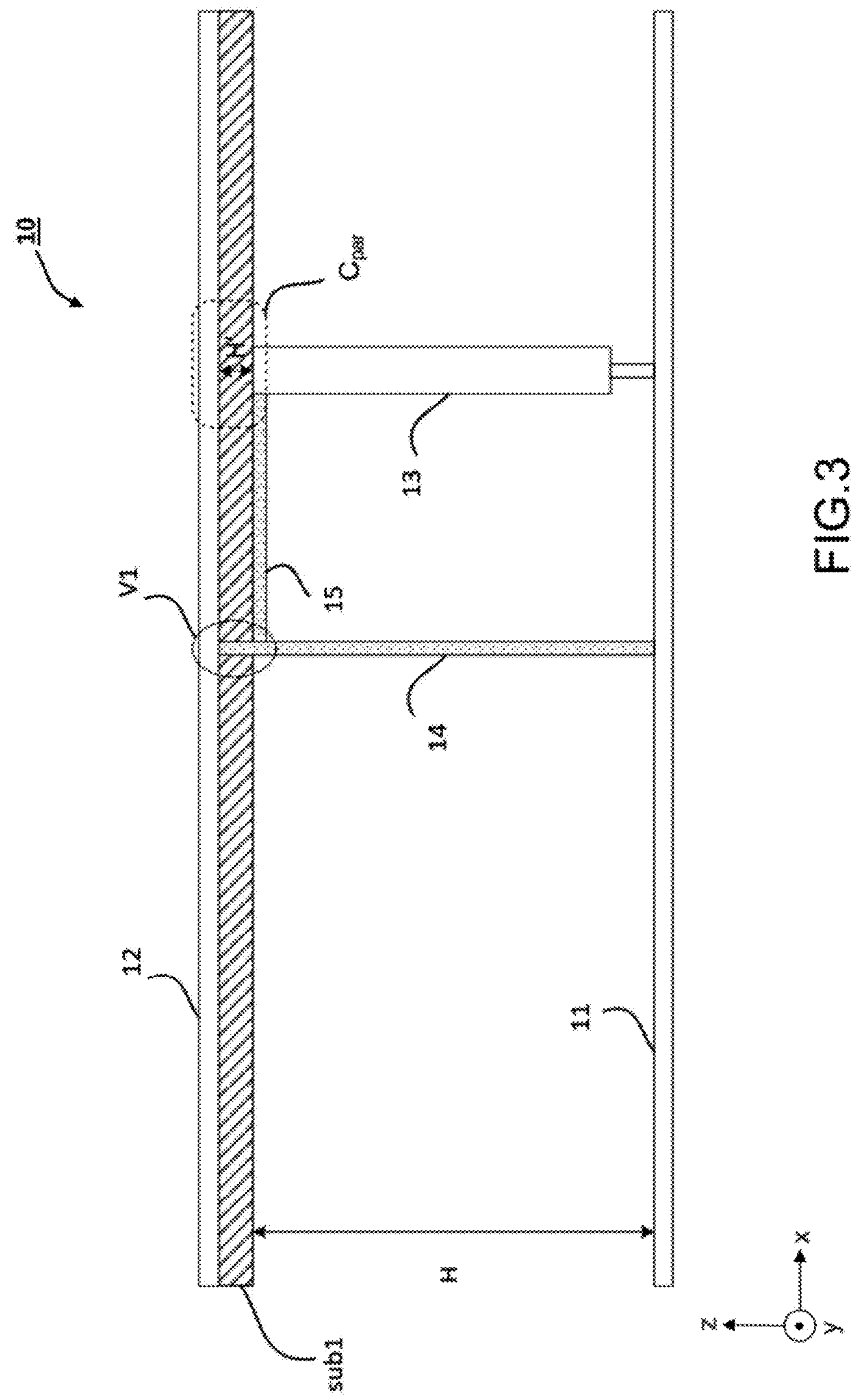
FIG. 3 shows a view of a cross section cut in the plane (x, z), illustrating a wire-patch antenna according to a second embodiment of the invention.

FIG. 3 illustrates a view of a cross section cut in the plane (x, z), illustrating a wire-patch antenna 10 according to a second embodiment of the invention. The second embodiment employs the same concept, with addition of the impedance-matching wire 15 and separation of the end of the probe 13 from the capacitive roof 12. The antenna 10 of FIG. 3 further comprises a substrate sub1 on which the capacitive roof 12 rests. This layer is producible using common deposition techniques, employed to obtain a copper layer that for example is 18 μm in thickness. The substrate sub1 may be a printed circuit board PCB.

In this embodiment, the impedance-matching wire 15 may be produced by printing (or depositing) a metal track (or metal strip) on the lower face of the substrate sub1. The substrate sub1 thus performs a mechanical function in that it plays the role of carrier for the capacitive roof 12 and for the impedance-matching wire 15. The substrate sub1 also performs an electrical function. Specifically, being confined between the upper end of the probe feed 13 and the lower face of the capacitive roof, the volume of dielectric of the parasitic capacitor $C_{par}$ is formed with the substrate sub1. Regarding the volume of dielectric between the capacitive roof 12 and the ground plane 11, it remains mainly filled with air given the small thickness of the substrate sub1 with respect to the first distance of separation H.

The short-circuiting wire 14 is connected to the capacitive roof 12 by way of a through-via V1 that passes right through the substrate sub1 from its lower face to its upper face, on which face the capacitive roof 12 rests.

Figure 4:
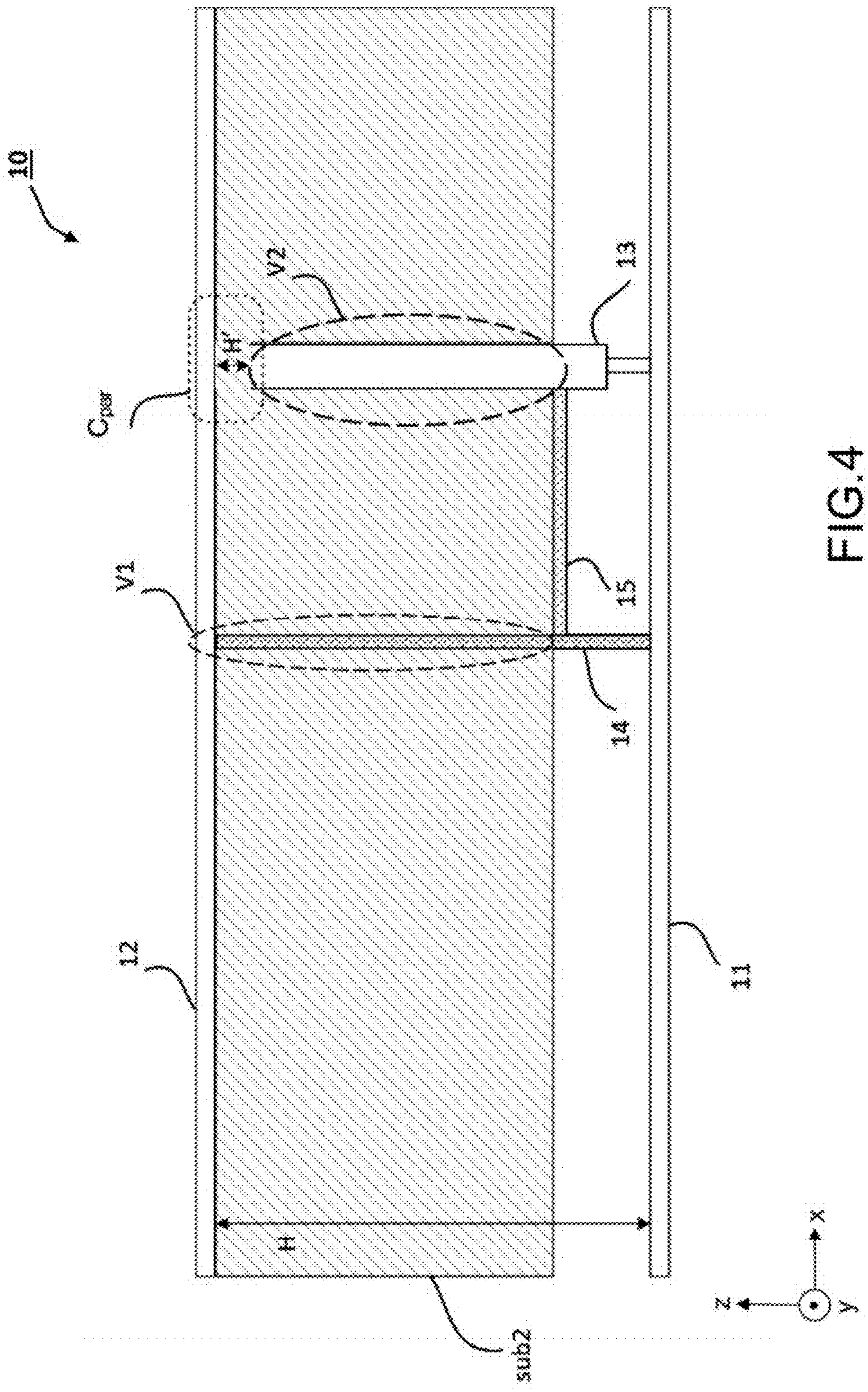
FIG. 4 shows a view of a cross section cut in the plane (x, z), illustrating a wire-patch antenna according to a third embodiment of the invention.

FIG. 4 shows a view of a cross section cut in the plane (x, z), illustrating a wire-patch antenna 10 according to a third embodiment of the invention. The third embodiment employs the same concept, with addition of the impedance-matching wire 15 and separation of the end of the probe 13 from the capacitive roof 12. The antenna 10 of FIG. 3 further comprises a substrate sub1 on which the capacitive roof 12 rests, in the same way as the second embodiment. However, the third embodiment differs from the second embodiment in that the thickness of the substrate is larger. The substrate sub2 is not confined between the upper end of the probe feed 12 but occupies a larger proportion of the volume bounded by the capacitive roof 12 and the ground plane 11. The substrate sub2 comprises a first through-via V1 containing one portion of the short-circuiting wire 14 extending as far as the capacitive roof 12. The substrate sub2 further comprises a second non-through via V2 that starts from its lower face but that does not open onto the interface of the substrate sub2 with the capacitive roof 12. The upper portion of the probe feed 12 is then inserted into the non-through via V2. The volume of the substrate sub2 confined between the upper end of the probe feed 13 and the lower face of the capacitive roof 12 forms the dielectric of the capacitive element $C_{par}$.

Use of a substrate sub2 occupying a ratio higher than 20% of the total volume between the capacitive roof 12 and the ground plane 11 considerably increases the mechanical robustness of the antenna. The dielectric that forms the substrate sub2 must be chosen such that its electrical permittivity is limited, and for example lower than 6, and preferably equal to 2, in order not to alter the electromagnetic behaviour of the antenna.

In this embodiment, it is possible to produce the impedance-matching wire 15 by printing (or depositing) a metal track (or metal strip) on the lower face of the substrate sub2. The substrate sub2 thus performs a mechanical function in that it plays the role of carrier for the capacitive roof 12 and for the impedance-matching wire 15. The substrate sub2 also performs an electrical function, forming as it does the dielectric of the capacitive element $C_{par}$.

Alternatively, the substrate sub2 occupies the entire height H separating the capacitive roof 12 and the ground plane 11. The impedance-matching wire 15 is confined in the substrate sub2.

Alternatively, the first, second or third embodiment comprises a plurality of short-circuiting wires 14 and a plurality of impedance-matching wires 15. A plurality of impedance-matching wires 15 allows an adjustable connection to be made between the probe feed 13 and one or more short-circuiting wires 14.

Figure 5:
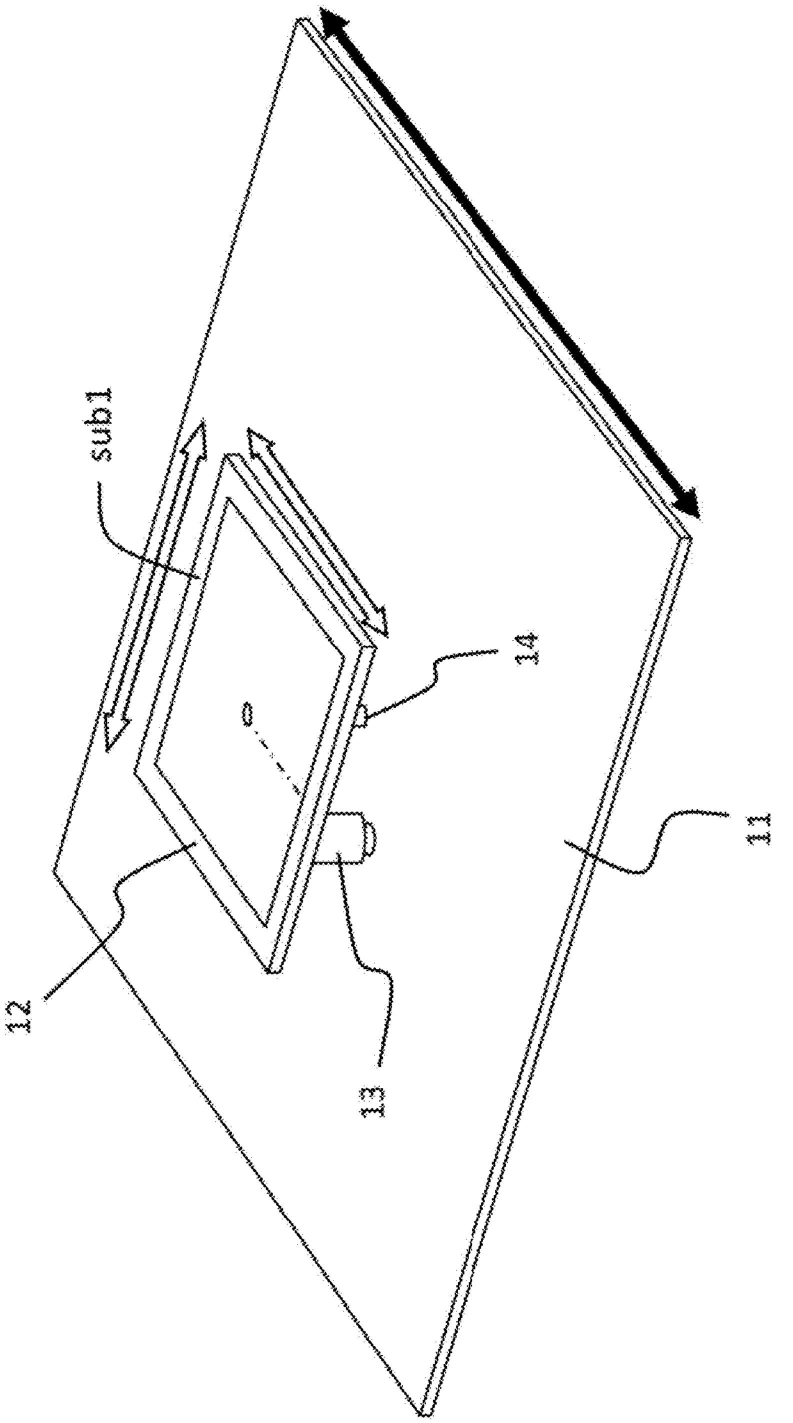
FIG. 5 shows a three-dimensional view illustrating a wire-patch antenna according to the second embodiment of the invention.

In order to allow how the wire-patch antenna according to the invention is implemented to be better understood, FIG. 5 illustrates a three-dimensional view illustrating a wire-patch antenna according to the second embodiment of the invention.

By way of illustration, here an example the dimensions of which allow the fundamental resonant mode to be excited at a frequency $f_0$=2.45 GHz and the first resonant mode in the low-frequency domain to be excited at a frequency $f_1$=915 MHz has been shown. The capacitive roof 12 of the antenna is a square metal layer deposited on the substrate sub1, which is a PCB substrate. The dimensions of the capacitive roof 12 are as follows: thickness 18 μm and side length of $\lambda_1/6$ with $\lambda_1$ the wavelength associated with the first resonant mode in the low-frequency domain (915 MHz). The capacitive roof 12 is suspended at a height of $\lambda_1/17.6$ above the ground plane 11. As explained above, the capacitive roof 11 may be produced on a printed circuit board in which the upper and lower layers are etched with the desired patterns.

The short-circuiting wire 14 allowing the first low-frequency monopole mode to be excited is placed at the centre of the capacitive roof 12. It is a question of a metal rod that may be cylindrical, parallelepipedal or pyramidal.

The geometry of the probe feed 13 and its distance with respect to the short-circuiting wire 14 are dimensioned to excite the fundamental mode $TM_{01}$ about 2.45 GHz and the first resonant mode in the low-frequency domain of 915 MHz. In this example, the distance between the probe feed 13 and the short-circuiting wire 14 is 18 mm—corresponding to $\lambda_1/18.5$.

In this example, the probe feed is composed of a rod of cylindrical shape that is $\lambda_1/22.2$ in height and the radius of which has been adjusted to guarantee a good impedance match at the operating frequencies of the antenna.

The impedance-matching wire 15 is a metal strip that is deposited on the lower face of the substrate sub1 and that links the upper end of the probe feed 13 to the short-circuiting wire 14. It is a question of a copper track of width comprised between 2 mm and 3 mm and of length comprised between 18 mm and 35 mm. The impedance-matching wire 15 allows a second resonant mode to be excited near the resonant mode in the low-frequency domain, allowing bandwidth BW to be enlarged in the frequency range from 700 MHz to 1.1 GHz.

The ground plane 11 is a square metal layer having an area larger than that of the capacitive roof 13.

For a dimensioning that guarantees that the fundamental resonant mode and the first low-frequency resonant mode are able to work as they should, the distance H separating the capacitive roof 12 from the ground plane 11 varies inversely to the areal dimensions of the capacitive roof 12. When the distance H separating the capacitive roof 12 from the ground plane 11 is increased, the side length of the square of the capacitive roof 12 must be decreased, and vice versa. It is possible to choose, for the distance H separating the capacitive roof 12 from the ground plane 11, a value comprised between $\lambda_1/50$ and $\lambda_1/10$. When the distance H is equal to the maximum value $\lambda_1/10$, the side length of the square defining the area of the capacitive roof 12 is set equal to $\lambda_1/10$. When the distance H is equal to the minimum value $\lambda_1/50$, the side length of the square defining the area occupied by the capacitive roof 12 is set equal to $\lambda_1/4$. This rule is tailored to the shape chosen for the area occupied by the capacitive roof 12 (radius for a circular area, width and length for a rectangle).

Figure 6:
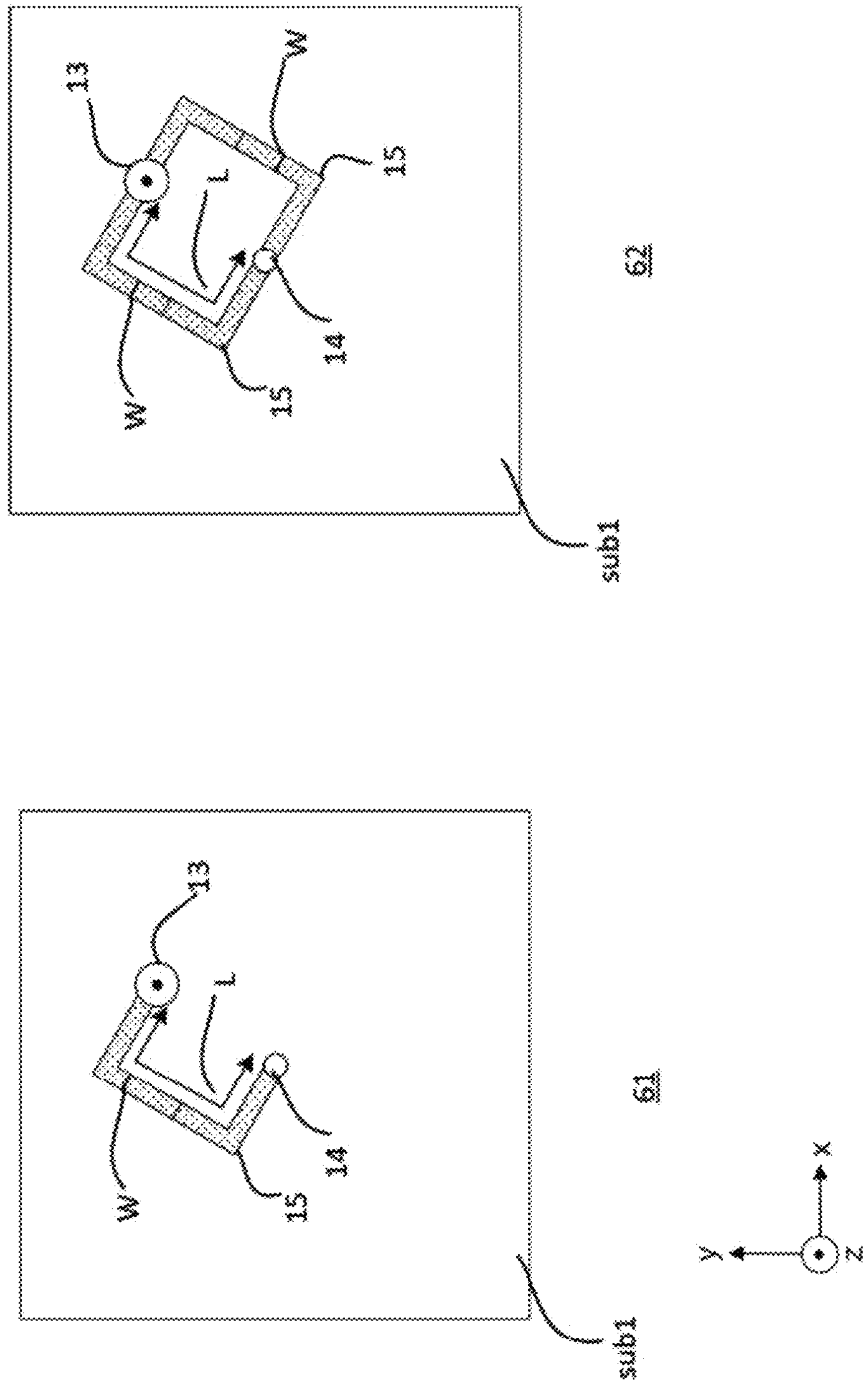
FIG. 6 shows a view from below of the substrate of the wire-patch antenna according to the second embodiment of the invention.
Figure 7A:
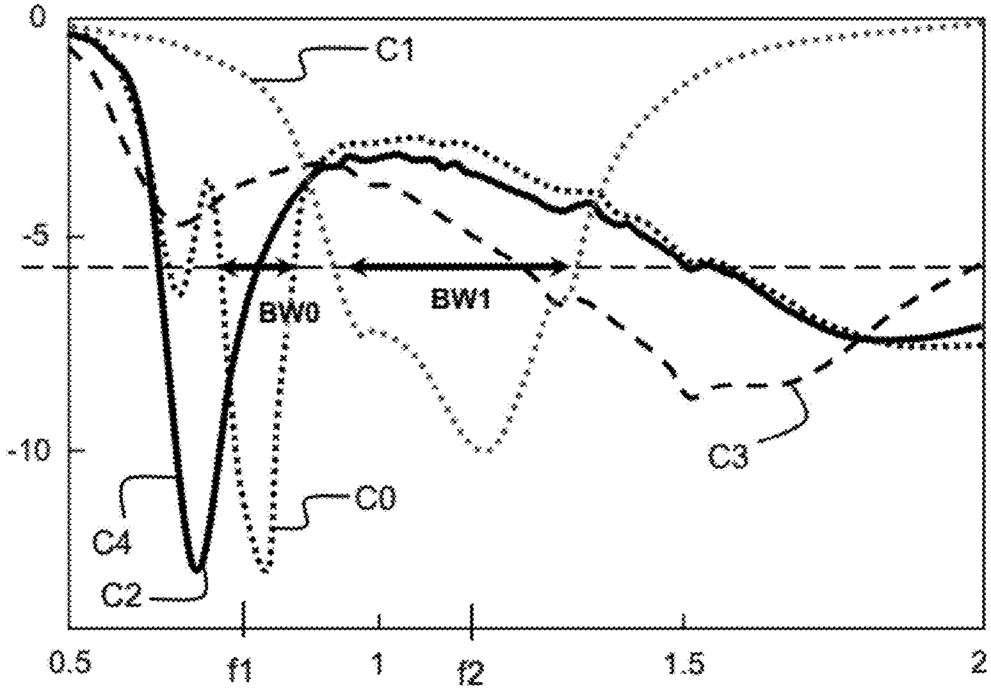
FIG. 7*a* illustrates a plurality of curves of variation in the reflection coefficient of the wire-patch antenna as a function of frequency, each curve corresponding to one configuration of electrical connection of the impedance-matching wire.
Figure 7B:
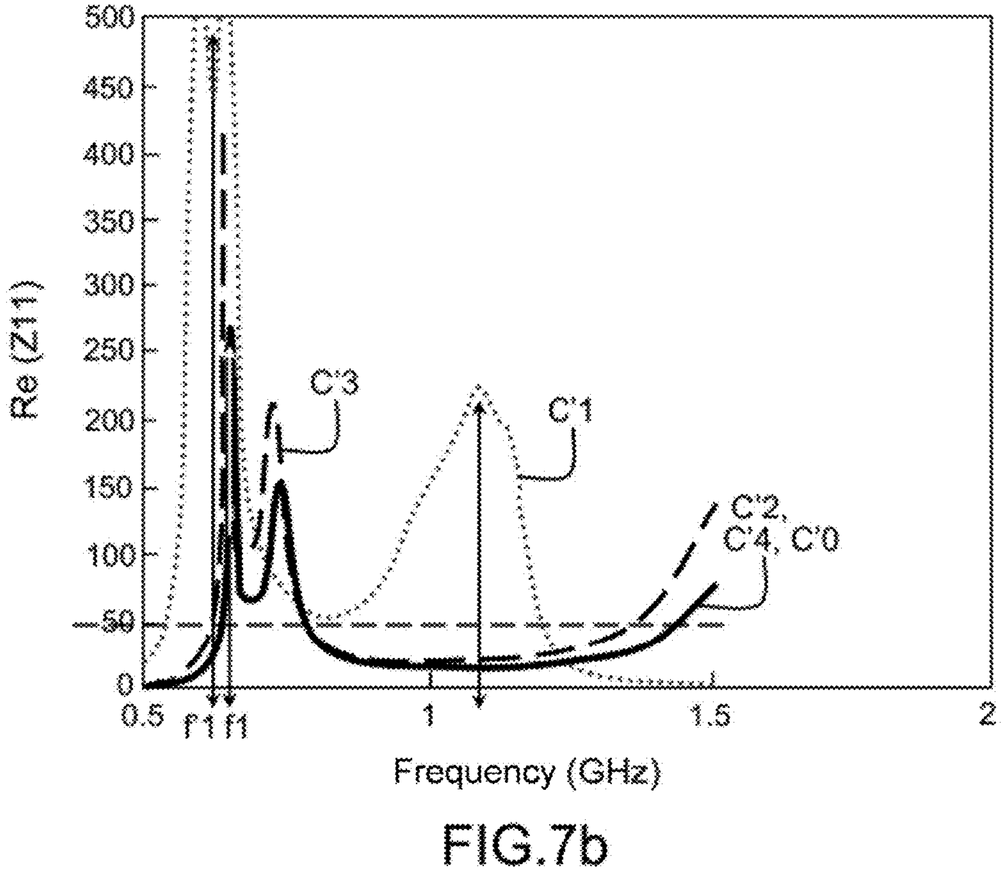
FIG. 7*b* illustrates a plurality of curves of variation in the real part of the input impedance of the wire-patch antenna as a function of frequency, each curve corresponding to one configuration of electrical connection of the impedance-matching wire.
Figure 7C:
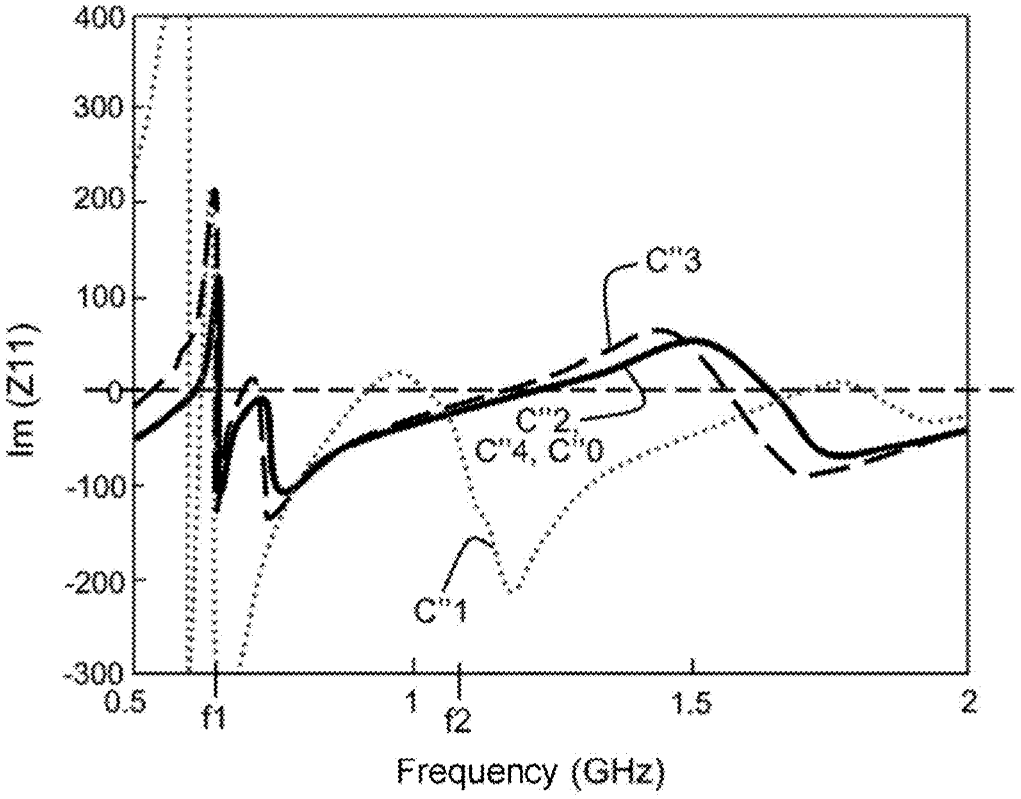
FIG. 7*c* illustrates a plurality of curves of variation in the imaginary part of the input impedance of the wire-patch antenna as a function of frequency, each curve corresponding to one configuration of electrical connection of the impedance-matching wire.

FIG. 6 illustrates a view from below of the substrate of the wire-patch antenna according to the second embodiment of the invention, in order to show how the impedance-matching wire 15 deposited on the lower face of the substrate sub1 is implemented. The inductance of the parasitic inductive element $L_{par}$ depends on the length L and width W of the metal strip deposited to produce the impedance-matching wire 15. Increasing L increases the inductance of the parasitic inductive element $L_{par}$ and vice versa.

Schematic 61 illustrates an impedance-matching wire 15 produced with a U-shaped metal strip linking the probe feed 13 to the short-circuiting wire 14. Use of a U shape provides the designer with a degree of freedom allowing the length L to be chosen without modifying the position of the probe feed 13 with respect to the short-circuiting wire 14. Specifically, the distance between the probe feed 13 and the short-circuiting wire 14 must remain unchanged in order not to alter the fundamental resonance at 2.45 GHz.

Schematic 62 illustrates two impedance-matching wires 15 each produced with a U-shaped metal strip linking the probe feed 13 to the short-circuiting wire 14. The two impedance-matching wires are placed symmetrically with respect to the straight line joining the upper end of the probe feed 13 and the upper end of the short-circuiting wire 14. In this example, the two impedance-matching wires have the same length L and the same width W and thus form the equivalent of a wire having a length equal to L and a width larger than 2×W. Use of this double metal strip provides the designer with a degree of freedom allowing the width W of the equivalent impedance-matching wire to be increased without exceeding the limits in terms of width W set by the constraints of the process used to manufacture the metal tracks.

FIG. **7*a* illustrates a plurality of curves of variation in the reflection coefficient of the wire-patch antenna as a function of frequency, each curve corresponding to one configuration of electrical connection of the impedance-matching wire. Curve C0 corresponds to a wire-patch antenna without impedance-matching wire 15. Curve C1 corresponds to a wire-patch antenna with an impedance-matching wire 15 touching at one end the short-circuiting wire 14 and at the other end the probe feed 13. Curve C2 corresponds to a wire-patch antenna with an impedance-matching wire 15 solely touching the short-circuiting wire 14. Curve C3 corresponds to a wire-patch antenna with an impedance-matching wire 15 solely touching the probe feed 13. Curve C4 corresponds to a wire-patch antenna with an impedance-matching wire 15 placed in proximity to the probe feed 13 and the short-circuiting wire 14** but not touching them.

FIG. **7*b* illustrates a plurality of curves of variation in the real part of the input impedance of the wire-patch antenna as a function of frequency, each curve corresponding to one configuration of electrical connection of the impedance-matching wire. Curve C'1 corresponds to a wire-patch antenna with an impedance-matching wire 15 touching at one end the short-circuiting wire 14 and at the other end the probe feed 13. Curve C'2 corresponds to a wire-patch antenna with an impedance-matching wire 15 solely touching the short-circuiting wire 14. Curve C'3 corresponds to a wire-patch antenna with an impedance-matching wire 15 solely touching the probe feed 13. Curve C'4 corresponds to a wire-patch antenna with an impedance-matching wire 15 placed in proximity to the probe feed 13 and the short-circuiting wire 14** but not touching them.

FIG. **7*c* illustrates a plurality of curves of variation in the imaginary part of the input impedance of the wire-patch antenna as a function of frequency, each curve corresponding to one configuration of electrical connection of the impedance-matching wire. Curve C"1 corresponds to a wire-patch antenna with an impedance-matching wire 15 touching at one end the short-circuiting wire 14 and at the other end the probe feed 13. Curve C"2 corresponds to a wire-patch antenna with an impedance-matching wire 15 solely touching the short-circuiting wire 14. Curve C"3 corresponds to a wire-patch antenna with an impedance-matching wire 15 solely touching the probe feed 13. Curve C"4 corresponds to a wire-patch antenna with an impedance-matching wire 15 placed in proximity to the probe feed 13 and the short-circuiting wire 14** but not touching them.

In order to allow the advantages of the configuration chosen to carry out the invention to be better understood, these three figures will be described together as they are related. It will be recalled that the criterion "lower than −6 dB" was chosen as limit of the reflection coefficient as a function of frequency to define bandwidth.

Curve C0, which corresponds to an antenna without impedance-matching wire, indicates a narrow bandwidth BW0 in the vicinity of the frequency $f_1$ of the first low-frequency monopole resonant mode. Likewise, considering curve C'0, the frequency range in which the real part of the impedance is close to 50Ω in the vicinity of $f_1$ is very narrow. This shows the limits of a wire-patch antenna without insertion of an impedance-matching wire 15 in terms of bandwidth.

On analysing the curves C4, C'4 and C"4, it will be noted that insertion of an impedance-matching wire 15 that is electrically insulated, i.e. that touches neither the probe feed 13 nor the short-circuiting wire 14, modifies the electrical characteristics of the wire-patch antenna very little relative to the prior-art solution described by the curves C0, C'0 and C"0. The bandwidth still remains narrow in the vicinity of $f_1$.

On analysing the curves C2, C'2 and C"2, it may be seen that placing the impedance-matching wire in contact solely with the short-circuiting wire 14 does not cause a significant change in impedance relative to the preceding configuration. The curves C2, C'2 and C"2 are overlaid on the curves C4, C'4 and C"4, respectively.

On analysing the curves C3, C'3 and C"3, it may be seen that placing the impedance-matching wire in contact with the probe feed results in more significant changes, with an increase in the input impedance of the antenna and a reflection coefficient better than the bandwidth criterion in the targeted frequency range [0.5 GHz, 1.5 GHz].

Lastly, curve C1 illustrates that, when the impedance-matching wire 15 is connected both to the probe feed 13 and to the short-circuiting wire 14, a bandwidth BW1 larger than the initial bandwidth BW0 is obtained. This bandwidth is located in the targeted frequency range [0.5 GHz, 1.5 GHz]. Curve C'1 indicates the appearance of a second resonant mode at a frequency $f_2$ of about 1.1 GHz. A shift in the first resonant mode is also observed, its frequency passing from $f_1$ to $f_1$. The shift in the first "wire-patch resonant" mode is 100 MHz towards low frequencies. This double-resonance effect allows a frequency range in which impedance remains stable at about 50Ω in the real part of the input impedance to be created between the two resonant peaks at $f'_1$ (associated with λ'1, which is almost equal to λ1) and $f_2$ (associated with λ2). It is this frequency range that is used to widen the band. It is thus possible to enlarge the bandwidth of the antenna without increasing the size of the wire-patch antenna or degrading its quality factor.

To better explain the effect of the impedance-matching wire 15, a plurality of parametric studies in which the effect of the dimensions of the strip, and especially of its width Wand its length L, were studied, will now be described.

Figure 8:
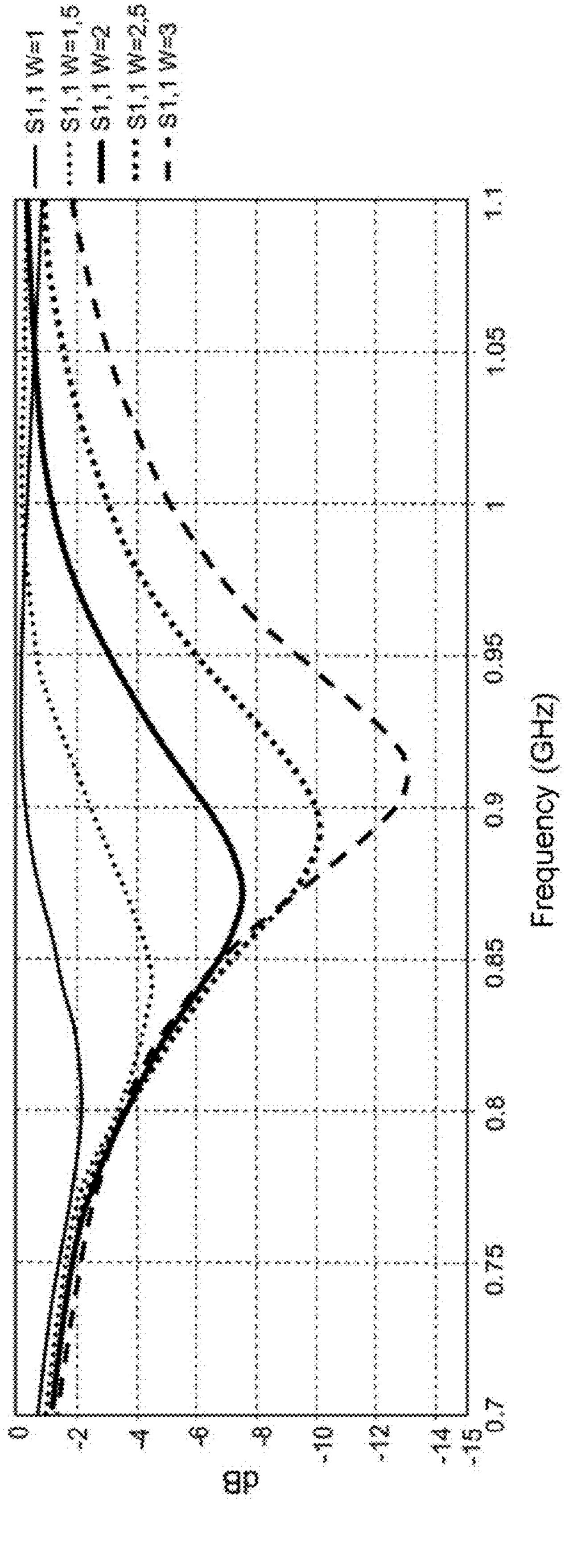
FIG. 8 illustrates a plurality of curves of variation in the reflection coefficient of the wire-patch antenna as a function of frequency, each curve corresponding to one width of the impedance-matching wire.

FIG. 8 illustrates a plurality of curves of variation in the reflection coefficient of the wire-patch antenna as a function of frequency, each curve corresponding to one impedance-matching-wire width.

For a set length of 34 mm, the results in respect of the variation in the reflection coefficient as a function of frequency have been illustrated for five values of impedance-matching-wire width W. The values chosen for the width W are in mm [1, 1.5, 2, 2.5, 3]. It follows that increasing wire width W causes an increase in resonant frequency because the impact of the inductive effect of the wire decreases with its width W. This parameter is a useful way of adjusting the imaginary part and thus of matching the antenna to 50Ω in the desired band.

Figure 9:
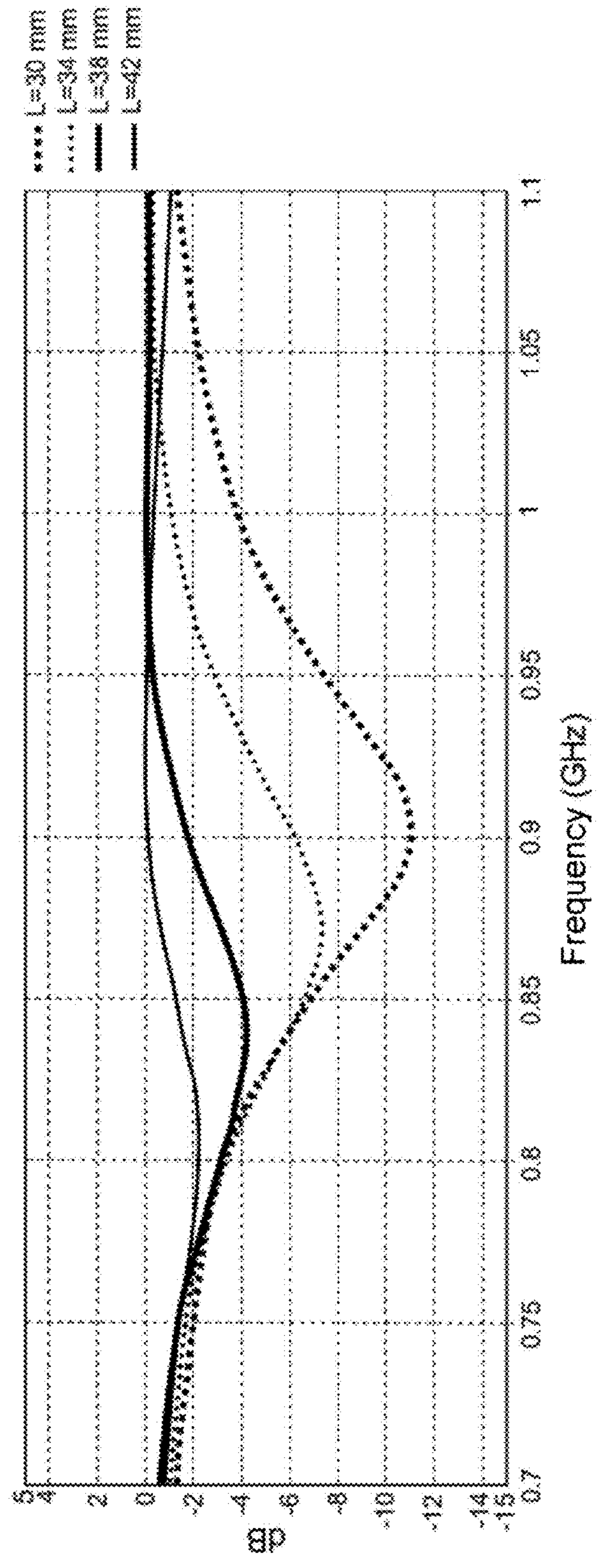
FIG. 9 illustrates a plurality of curves of variation in the reflection coefficient of the wire-patch antenna as a function of frequency, each curve corresponding to one length of the impedance-matching wire.

FIG. 9 illustrates a plurality of curves of variation in the reflection coefficient of the wire-patch antenna as a function of frequency, each curve corresponding to one impedance-matching-wire length.

For a set width of 2 mm, the results in respect of the variation in the reflection coefficient as a function of frequency have been illustrated for four values of impedance-matching-wire length L. The values chosen for the length L are in mm [30, 34, 38, 42]. It follows that increasing the wire length L causes a decrease in resonant frequency because the impact of the inductive effect of the wire increases with its length L. This parameter is a useful way of adjusting the imaginary part and thus of matching the antenna to 50Ω in the desired band.

Figure 10:
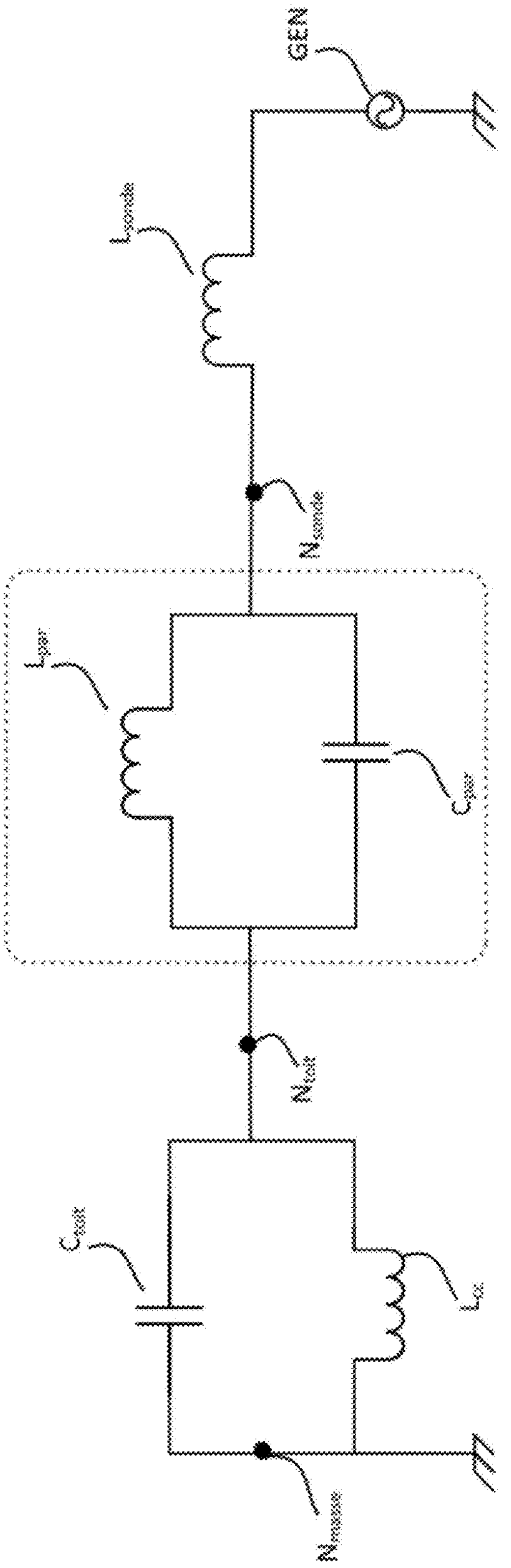
FIG. 10 illustrates a circuit diagram modelling the wire-patch antenna according to the invention.

FIG. 10 illustrates a circuit diagram modelling the wire-patch antenna according to the invention. Specifically, it is possible to model the antenna according to the invention electrically in the following way:

- the probe feed 13 may be likened to an inductive element $L_{sonde}$ connected to the generator GEN;
- the impedance-matching wire may be likened to a parasitic inductive element $L_{par}$;
- the upper end of the probe feed, which is separated from the lower face of the capacitive roof 12 by a dielectric, forms a parasitic capacitive element $C_{par}$. Specifically, the electromagnetic-coupling-based interaction between the two unconnected conductive areas allows a capacitive effect designated $C_{par}$ to be created;
- the capacitive roof 12 placed facing the ground plane at a distance of separation H forms a capacitive element $C_{toit}$;
- the short-circuiting wire 14 may be likened to a parasitic inductive element $L_{cc}$.

The capacitive element $C_{toit}$ and the inductive element $L_{cc}$ together form a parallel circuit $L_{cc}C_{toit}$ placed between the electrical node $N_{toit}$ associated with the capacitive roof 12 and the electrical node $N_{masse}$ associated with the ground plane 11. The parallel circuit $L_{cc}C_{toit}$ is used to excite the first low-frequency resonant mode at $f'_1$.

The parasitic capacitive element $C_{par}$ and the parasitic inductive element $L_{par}$ together form a parallel circuit $L_{par}C_{par}$ placed between the electrical node $N_{sonde}$ associated with the end of the implementation probe 13 and the electrical node $N_{toit}$ associated with the capacitive roof 12. The parallel circuit $L_{par}C_{par}$ is used to excite the second resonant mode in the low-frequency domain at $f_2$.

The dimensions of the antenna are chosen to obtain a pair of frequencies $f'_1$ and $f_2$ that are quite close together, so as to obtain a wide bandwidth in the low-frequency range of operation. By the expression "quite close together", what is meant is a frequency difference comprised between 1.1 GHz and 1.5 GHz absolute value. Choosing the dimensions of the antenna covers choosing the following parameters:

- the width and length of the impedance-matching wire 15, to define the inductance of $L_{par}$;
- the width and length of the short-circuiting wire 14, to define the inductance of $L_{cc}$;
- the dimensions of the probe feed 13, to define the inductance of $L_{sonde}$;
- the height of the dielectric volume separating the ground plane 11 and the capacitive roof 12; and the area of the capacitive roof 12, to define the capacitance of $C_{toit}$;
- the height of the dielectric volume separating the capacitive roof 12 and the upper end of the probe feed 13; and the area of the upper face of the probe feed 13, to define the capacitance of $C_{par}$;
- the distance between the short-circuiting wire 14 and the probe feed 13.

Advantageously, the new resonance may also be adjusted to $f_2$ by adding a discrete component or an adjustable component in series or parallel with the parasitic track in order to adjust the central frequency of the bandwidth obtained via the combination of $f'_1$ and $f_2$. By discrete component, what is meant is a basic electronic component the role of which is to perform an elementary function. In the context of the invention, this term covers passive discrete components such as inductors, capacitors, and resistors.

Alternatively, it is possible to insert active LC circuits into the structure to create a resonance and enlarge the bandwidth. This has the advantage of allowing more precise control of the inductance $L_{par}$.

Figure 11:
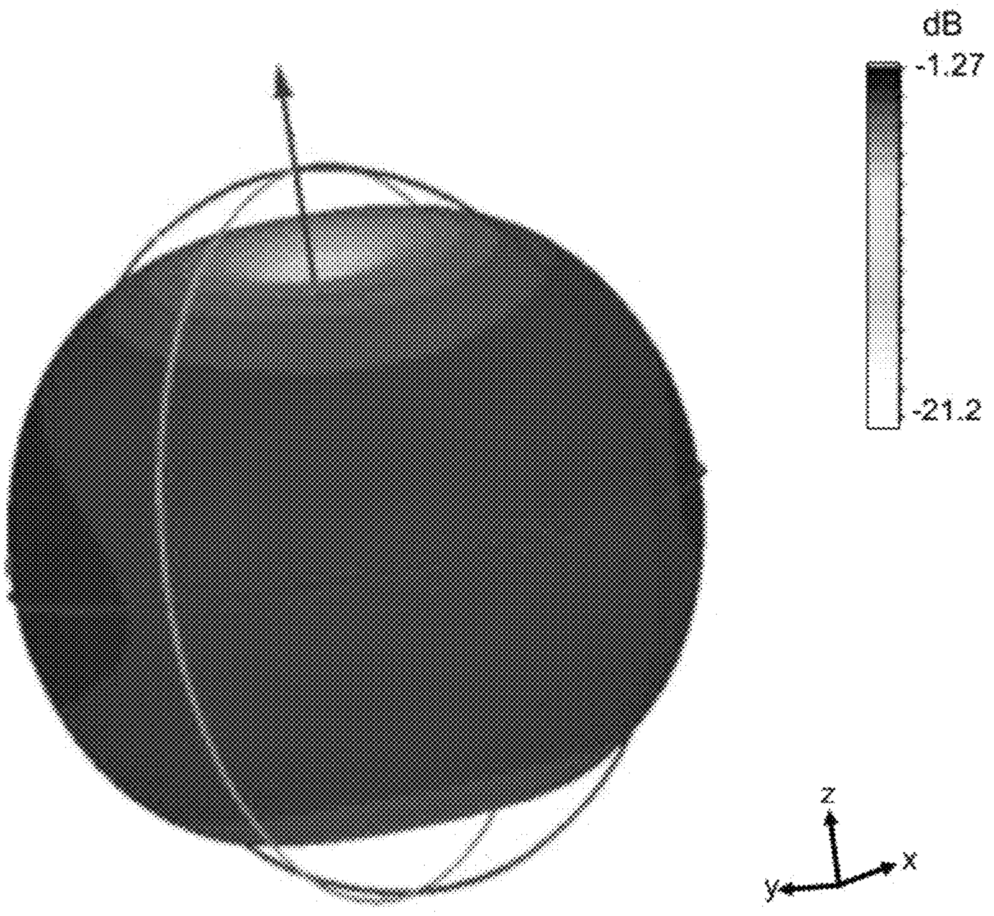
FIG. 11 illustrates a three-dimensional radiation pattern of the wire-patch antenna according to the invention.

FIG. 11 illustrates a three-dimensional radiation pattern of the wire-patch antenna according to the invention. The wire-patch antenna according to the invention has the advantage of an omnidirectional radiation pattern, as illustrated in FIG. 11. More precisely, the figure illustrates the pattern in three dimensions of the gain achieved in the GSM band (at 917 MHz). The efficiency of the antenna is higher than 60% over a band of 80 MHz width corresponding to 10% of the relative band.

Figure 12:
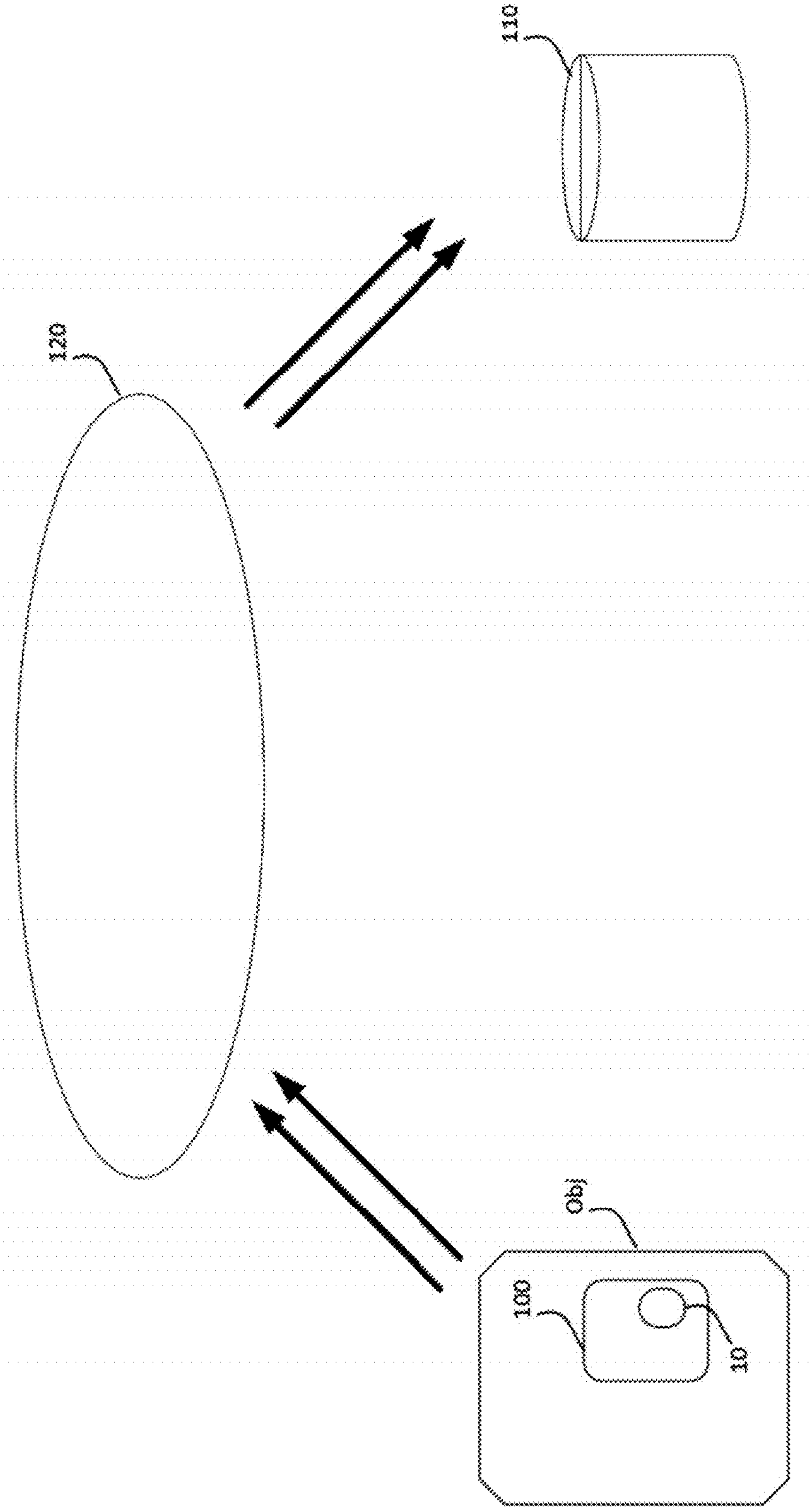
FIG. 12 illustrates a schematic of operation of a geopositioning device comprising a wire-patch antenna according to the invention.

FIG. 12 illustrates a schematic diagram of operation of a geopositioning device comprising a wire-patch antenna according to the invention. The geopositioning device 100 is intended to be integrated into a moving object such as a vehicle, a mobile telephone, or a smart watch, these examples being non-limiting. The geopositioning device comprises at least one wire-patch antenna 10 according to the invention. The antenna 10 is configured to transmit, to a remote server 110, via a communication system 120, the various positions of the moving object.

The invention claimed is:

1. A wire-patch antenna comprising:

a ground plane;

a capacitive roof placed facing the ground plane at a predetermined distance of separation;

a probe feed;

at least one electrically conductive short-circuiting wire linking the capacitive roof and the ground plane, the short-circuiting wire being intended to excite a first resonant mode at a first resonant wavelength (λ1, λ'1);

at least one electrically conductive impedance-matching wire electrically connecting the conductive short-circuiting wire and the probe feed so as to create a parasitic inductor ($L_{par}$);

the end of the probe feed being separated from the capacitive roof by a volume of dielectric so as to create a parasitic capacitive element ($C_{par}$);

the parasitic capacitive element ($C_{par}$) and the parasitic inductor ($L_{par}$) forming a parallel LC circuit allowing a second resonant mode to be excited at a second resonant wavelength (λ2) shorter than the first resonant wavelength (λ1, λ'1).

2. The wire-patch antenna according to claim 1, wherein the distance of separation (H) between the ground plane and the capacitive roof is comprised between one fiftieth of the first resonant wavelength (λ1, λ'1) and one tenth of the first resonant wavelength (λ1, λ'1).

3. The wire-patch antenna according to claim 1, wherein the capacitive roof is produced using a conductive layer forming a rectangular planar area with a width and/or length comprised between one tenth of the first resonant wavelength (λ1, λ'1) and one quarter of the first resonant wavelength (λ1, λ'1).

4. The wire-patch antenna according to claim 1, wherein the width and/or length of the impedance-matching wire is chosen depending on the value of the bandwidth defined by the first and second resonant modes.

5. The wire-patch antenna according to claim 1, wherein the volume of dielectric separating the capacitive roof and the probe feed is a volume of air.

6. The wire-patch antenna according to claim 5, wherein an impedance-matching wire is a metal rod.

7. The wire-patch antenna according to claim 1, further comprising a dielectric substrate (sub1, sub2) such that:

the capacitive roof is deposited on the upper face of the substrate (sub1);

the lower face of the substrate (sub1, sub2) is oriented towards the ground plane.

8. The wire-patch antenna according to claim 7, wherein an impedance-matching wire is a metal track deposited on the lower face of the substrate (sub1, sub2).

9. The wire-patch antenna according to claim 7, wherein the short-circuiting wire is connected to the capacitive roof by way of a through-via (V1) that passes right through the substrate (sub1) from its lower face to its upper face.

10. The wire-patch antenna according to claim 7, wherein the substrate (sub1) is confined between the end of the probe feed and the capacitive roof so as to produce the volume of dielectric.

11. The wire-patch antenna according to claim 7, wherein the probe feed is inserted into the substrate (sub2) by way of a non-through via (V2) starting from its lower face.

12. The wire-patch antenna according to claim 1, wherein the short-circuiting wire and the probe feed are perpendicular to the ground plane and to the capacitive roof.

13. The wire-patch antenna according to claim 1, further comprising a discrete component connected in series or in parallel with the impedance-matching wire in order to adjust the value of the impedance of the parallel LC circuit.

14. A geopositioning device intended to be integrated into a moving object (Obj) comprising at least one wire-patch antenna according to claim 1, said antenna being configured to transmit, to a remote server, via a communication system, the various positions of the moving object.

* * * * *